US009046931B2

(12) United States Patent
Suh et al.

(10) Patent No.: US 9,046,931 B2
(45) Date of Patent: *Jun. 2, 2015

(54) APPARATUS AND METHOD FOR ADAPTATION OF INPUT/OUTPUT INTERFACE IN VIRTUALIZATION ENVIRONMENT

(71) Applicants: Samsung Electronics Co., Ltd., Suwon-si (KR); Georgia Tech Research Corporation, Atlanta, GA (US)

(72) Inventors: Sang-bum Suh, Seoul (KR); Xiang Song, Atlanta, GA (US); Kishore Ramachandran, Atlanta, GA (US); Joo-young Hwang, Suwon-si (KR); Jung-hyun Yoo, Hwaseong-si (KR); Dushmanta Mohapatra, Atlanta, GA (US)

(73) Assignees: Samsung Electronics Co., Ltd., Suwon-si (KR); Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/927,670

(22) Filed: Jun. 26, 2013

(65) Prior Publication Data

US 2013/0290575 A1 Oct. 31, 2013

Related U.S. Application Data

(63) Continuation of application No. 12/485,086, filed on Jun. 16, 2009, now Pat. No. 8,527,679.

(60) Provisional application No. 61/061,705, filed on Jun. 16, 2008.

(51) Int. Cl.
G06F 3/00 (2006.01)
G06F 13/00 (2006.01)
(Continued)

(52) U.S. Cl.
CPC ............ *G06F 3/023* (2013.01); *G06F 9/45558* (2013.01); *G06F 9/5055* (2013.01); *G06F 9/541* (2013.01); *G06F 9/544* (2013.01); *G06F 13/107* (2013.01); *G06F 2009/45579* (2013.01)

(58) Field of Classification Search
USPC ....................................... 710/3, 8–10, 72–74
See application file for complete search history.

(56) References Cited

U.S. PATENT DOCUMENTS 6,535,931 B1 3/2003 Celi, Jr.
6,556,217 B1 4/2003 Makipaa et al.
(Continued)

FOREIGN PATENT DOCUMENTS

JP 2006-190281 7/2006
JP 2007-323245 12/2007
(Continued)

OTHER PUBLICATIONS

Fu, RY, Su, H, Fletcher, JC, Li, W, et al., "A Framework for Device Capability On Demand and Virtual Device User Experience," Sep.-Nov. 2004, IBM Journal of Research and Development, pp. 1-2.
(Continued)

*Primary Examiner* — Tammara Peyton
(74) *Attorney, Agent, or Firm* — NSIP Law

(57) ABSTRACT

Provided are an apparatus and method for adapting an input/output interface. According to the exemplary method, a host system adapts an input/output interface of the guestsystem a to an input/output unit capability of a host system so as to support a service supported by an input/output unit supporting the input/output unit capability of the guest system using the at least one input/output unit of the host system.

37 Claims, 5 Drawing Sheets

(51) Int. Cl.
*G06F 3/023* (2006.01)
*G06F 9/455* (2006.01)
*G06F 9/50* (2006.01)
*G06F 9/54* (2006.01)
*G06F 13/10* (2006.01)

(56) References Cited

U.S. PATENT DOCUMENTS

| | | | |
|---|---|---|---|
| 6,968,307 | B1 | 11/2005 | Chrysanthakopoulos |
| 7,373,656 | B2 | 5/2008 | Lang et al. |
| 7,574,709 | B2 | 8/2009 | Erlingsson et al. |
| 7,739,417 | B2 * | 6/2010 | Liu et al. .......................... 710/3 |
| 2003/0236892 | A1 | 12/2003 | Coulombe |
| 2006/0146057 | A1 | 7/2006 | Blythe |
| 2007/0214187 | A1 | 9/2007 | Thomas et al. |
| 2007/0283009 | A1 | 12/2007 | Takemura |
| 2008/0028441 | A1 | 1/2008 | Novoa et al. |
| 2008/0077713 | A1 | 3/2008 | Kim et al. |
| 2008/0077917 | A1 | 3/2008 | Chen et al. |
| 2008/0115127 | A1 | 5/2008 | Hatano et al. |
| 2008/0163210 | A1 | 7/2008 | Bowman et al. |
| 2008/0168188 | A1 | 7/2008 | Yue et al. |
| 2009/0106754 | A1 | 4/2009 | Liu et al. |
| 2010/0031325 | A1 | 2/2010 | Maigne et al. |
| 2010/0077396 | A1 | 3/2010 | Choi et al. |

FOREIGN PATENT DOCUMENTS

| | | |
|---|---|---|
| JP | 2008-123303 | 5/2008 |
| JP | 2008-165795 | 7/2008 |
| KR | 10-2006-0079088 | 7/2006 |
| KR | 10-2008-0027713 | 3/2008 |
| KR | 10-2008-0063172 | 7/2008 |

OTHER PUBLICATIONS

Sang-bum Suh, et al., "Chameleon: A Capability Adaptation System for Interface Virtualization," Jun. 17, 2008, Proceedings fo MobiVirt 2008, pp. 1-5.

Ian Pratt, et al., "Xen 3.0 and the Art of Virtualization," University of Cambridge, Linux Symposium, 2005, pp. 65-77.

* cited by examiner

APPARATUS AND METHOD FOR ADAPTATION OF INPUT/OUTPUT INTERFACE IN VIRTUALIZATION ENVIRONMENT

CROSS-REFERENCE TO RELATED APPLICATION(S)

This application is a continuation of U.S. patent application Ser. No. 12/485,086, filed on Jun. 16, 2009, which claims the benefit under 35 U.S.C. §119(a) of a Korean Patent Application No. 10-2008-0131669, filed on Dec. 22, 2008, and a U.S. Provisional Patent Application No. 61/061,705, filed on Jun. 16, 2008, the disclosures of each of which are incorporated herein in their entirety by reference for all purposes.

BACKGROUND

1. Field

The following description relates to a virtualization system, and more particularly, to a virtualization system allowing the dynamic migration of guest systems.

2. Description of the Related Art

An operating system (OS) includes a group of programs that provide interfaces so that a user can conveniently utilize the hardware in a computing device such as a personal computer. An operating system is used to manage resources, such as processors, memories, input/output interfaces, and communication devices.

Using a virtualization technology, a system that can support a plurality of operating systems may be provided. The concept behind a virtualization technology is to create a virtual layer on a host operating system or provide a hypervisor which itself provides a virtual layer and then create a plurality of logic virtual machines on the virtual layer. A guest operating system may be installed in each logic virtual machine, and each guest operating system may install an application supported by the guest operation system.

SUMMARY

According to one general aspect, there is provided an apparatus having a host system configured to adapt an input/output interface, wherein in response a guest system having an input/output unit capability migrating to the apparatus having the host system which controls at least one input/output unit, the host system adapts an input/output interface of the guest system to the input/output unit capability of the host system desired by the guest system so as to provide a service supported by the input/output unit capability of the guest system using the at least one input/output unit of the host system.

The host system may include a plurality of capability adaptors, each of which is configured to adapt an input/output unit capability to a different input/output unit capability, wherein the host system may select at least one capability adaptor from among the plurality of capability adaptors to adapt the capability of the input/output unit set up in the guest system to the capability of the input/output unit of the host system desired by the guest system.

The host system may create a virtual device interface according to a type of input/output unit desired by the guest system, and connect the selected at least one capability adaptor to a frontend driver of the guest system through the virtual device interface, and to a backend driver of the host system corresponding to the at least one input/output unit.

The guest system may migrate to the apparatus having the host system through a portable storage.

The plurality of capability adaptors may be dynamically changed so as to be newly registered and installed or uninstalled.

The plurality of capability adaptors may include a capability adaptor to convert a first resolution to a second resolution.

In response to a type of the input/output unit supporting the input/output unit capability of the guest system being an input device supporting a keypad and the at least one input/output unit controlled by the host system being a touch panel, the at least one capability adaptor may create a virtual keypad on the touch panel so as to provide the virtual keypad to a user.

The host system may include a registry including a plurality of capability adaptors, each of which is configured to adapt an input/output unit a capability to an different input/output unit capability, a match maker configured to select at least one capability adaptor from among the plurality of capability adaptors to adapt the capability of the input/output unit set up in the guest system to the capability of the input/output unit of the host system desired by capability of the guest system, and a connection manager configured to provide a virtual device interface connecting a frontend driver of the guest system to a backend driver of the host system corresponding to the at least one input/output unit capability of the host system.

In response to the connection manager receiving information on capability of the at least one input/output unit set up in the guest system and information on capability of an input/output unit of the host system desired by the guest system, the connection manager may transfer the received information to the match maker, and connect the at least one capability adaptor selected by the match maker to the virtual device interface and the backend driver of the host system.

According to another aspect, there is provided a method for adapting an input/output interface of a guest system to an input/output interface desired by a guest system, wherein the host system controls at least one input/output unit and the guest system desires to use the at least one input/output unit through the host system, the method including in response to the guest system migrating to an apparatus having the host system, adapting the input/output interface of the guest system to the input/output unit capability of the host system desired by the guest system, and providing a service supported by an input/output unit supporting the input/output unit capability of the guest system, through the at least one input/output unit controlled by the host system.

The adapting of the input/output interface of the guest system may include selecting at least one capability adaptor from among a plurality of capability adaptors, each adaptor being configured to adapt an input/output unit capability to an different input/output unit capability, to adapt the capability of the input/output unit set up in the guest system to the capability of the input/output unit of the host system desired by the guest system.

The adapting of the input/output interface of the host system may further include creating a virtual device interface according to a type of input/output unit desired by the guest system, and connecting the selected at least one capability adaptor to a fronted driver of the guest system through the virtual device interface, and to a backend driver of the host system corresponding to the at least one input/output unit.

The host system may include a registry, a match maker, and a connection manager configured to adapt the input/output interface of the guest system, the registry including a plurality of capability adaptors, each adaptor being configured to adapt an input/output unit capability to an different input/output unit capability, and the adapting of the input/output interface of the host system may include creating by the connection manager a virtual device interface to connect a frontend driver of the guest system to a backend driver of the host system corresponding to the input/output unit capability of the host system, receiving by the connection manager information on capability of the at least one input/output unit set up in the guest system and information one capability of an input/output unit desired by the guest system, and transferring by the connection manager the received information to the match maker, selecting by the match maker at least one capability adaptor from among the plurality of capability adaptors, each of which to adapt the capability of the at least one input/output unit set up in the guest system to the capability of the input/output unit of the host system desired by the guest system, based on the received information, and connecting by the connection manager the at least one capability adaptor selected by the match maker to the virtual device interface and a backend driver of the host system corresponding to the at least one input/output unit.

According to still another aspect, there is provided a computer-readable storage medium having embodied thereon a computer program for executing a method for adapting an input/output interface of a guest system to an input/output interface desired by a guest system, the host system controlling at least one input/output unit and the guest system desiring to use the at least one input/output unit through the host system, the method including in response to the guest system migrating to an apparatus having the host system, adapting the input/output interface of the guest system to the input/output unit of the host system desired by the guest system, and providing a service supported by an input/output unit supporting the input/output unit capability of the guest system, through the at least one input/output unit controlled by the host system.

Other features and aspects will be apparent from the following detailed description, the drawings, and the claims.

Figure 1:
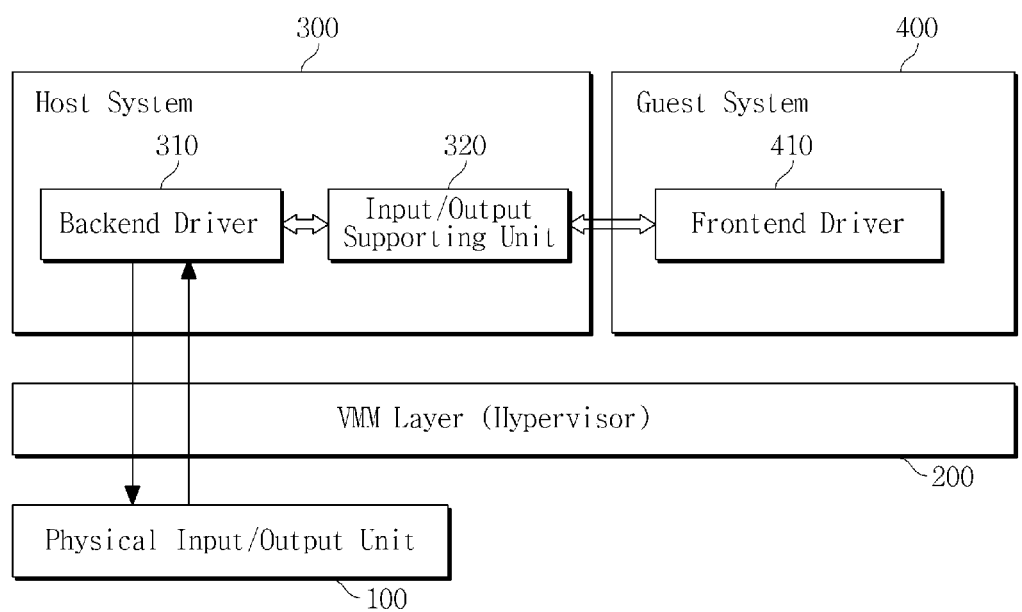
FIG. 1 is a block diagram illustrating a system architecture where an exemplary apparatus for dynamic adaptation of an input/output interface is provided.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 shows an implementation of a system architecture where an exemplary apparatus for adaptation of an input/output interface is provided.

The system architecture of the apparatus supports a plurality of operating systems including a host system 300 and a guest system 400. The apparatus for dynamic adaptation of an input/output interface may be based on a Virtual Machine Monitor (VMM) layer 200. The VMM layer 200 can contain software, such as VMM, Hypervisor, L4, and the like. Also, the VMM layer 200 may support service migration to store the execution state of the guest system 400 and then run it on a different device.

The input/output interface dynamic adaptation apparatus may be one of various terminals, such as a mobile phone, mobile internet device (MID), digital television (DTV), personal digital assistant (PDA), ultra mobile PC (UMPC), and the like.

The VMM layer 200 visualizes hardware resources to allow guest operating systems to take control of the hardware resources, and manages the allocation of the hardware resources to the guest operating systems. According to an implementation, a plurality of operating systems 300 and 400 run on the same hardware whereas each operates as if running on a separate hardware. The number of operating systems (or domains) that can operate on the same system depends on hardware resource(s). Also, the VMM layer 200 creates different domains for these operating systems in separated address spaces, which may be called virtual machines (VM). Here, each domain may refer to an environment in which an operating system operates.

One operating system among the operating systems functions as the host system 300, which has direct controls on the hardware.

FIG. 1 shows only two operating systems 300 and 400 for convenience of description, but it is understood that the number of guest systems is not limited thereto. Also, FIG. 1 shows only a physical input/output unit 100 among various hardware resources, but it is also understood that other hardware resources can be applied to the current implementation. The physical input/output unit 100 may be a display, audio output unit, keyboard, mouse, track ball, touch pad, graphic tablet, joystick, and the like.

The host system 300 hosts a backend driver 310 which is one of the physical device drivers used in generic operating systems, on the VMM layer 200. While FIG. 1 shows only one backend driver 310, a plurality of backend drivers can be provided according to the type of the physical input/output unit 100. The backend driver 310 directly accesses and controls the physical input/output unit 100.

The physical input/output unit 100 may be, for example, a display, and the display may be one of various types of displays with different resolution, color depth, and the like.

The physical input/output unit 100, which is hardware of the host system 300, may have a different capability from that of an input/output device set up in the guest system 400. The types of physical input/output units that are compatible with the host system 300 may be more limited than the input/output types set up in the guest system 400. In a case where the physical input/output unit 100 of the host system 300 is a display, the display may have size/resolution and color settings which are different from a display type set up in the guest system 400.

The guest system 400 includes a frontend driver 410. When the guest system 400 is loaded in the host system, the frontend driver 410 can be connected to the backend driver 310 through an input/output supporting unit 320.

The input/output supporting unit 320 creates a virtual device interface according to an input/output unit type desired by the guest system 400, and connects the frontend driver 410 to the backend driver 310 through the virtual device interface.

The input/output supporting unit 320 allows at least one input/output unit installed in the guest system 400 to provide a service supported by the capability of the input/output unit of the guest system 400, using input/output unit capability of the host system 300 desired by the guest system 400. Accordingly, the input/output supporting unit 320 can include a plurality of capability adaptors (not shown) to provide a service supported by the capability of an input/output unit to input/output units having different capabilities.

A capability adaptor allows an input/output unit interface of the guest system 400 to adapt an input/output unit interface of host system 300 corresponding to an input/output unit type desired by the guest system 400. According to an implementation, the capability adaptors may be dynamically changed so as to be newly registered and installed or uninstalled.

One of the capability adaptors may be a capability adaptor for changing resolutions. For example, by using the capability adaptor for changing resolutions, a user, who has stopped watching a movie on a PDA, can watch the movie on a TV with a larger display at home seamlessly from the point at which the movie has been stopped.

Also, a capability adaptor may execute at least one function to adapt an input/output interface of the frontend driver 410 to the physical input/output unit 100 of the host system 300. For example, an update display function may be executed to adjust a frame buffer size to a desired size. That is, a capability adaptor may convert an 800×600 screen to a 400×300 screen whereas another capability adaptor may convert a 400×300 screen to an 800×600 screen. As another example, where an input/output unit of the guest system 400 is a key pad and an input/output unit supported by the host system 300 is a touch panel, a capability adaptor may provide a virtual keypad on the touch panel in order to receive a user input through the virtual keypad.

The input/output supporting unit 320 can select and use at least one capability adaptor from among the plurality of capability adaptors so as to adapt the capability of the input/output unit set up in the host system 300 to capability of an input/output unit type desired by the guest system 400. Accordingly, the input/output supporting unit 320 can connect the selected capability adaptor to the backend driver 310 of the host system 300 corresponding to the input/output unit type desired by the guest system 400 through a virtual device interface.

Therefore, when a guest system with an input/output unit capability which is different from that of a host system migrates to the host system, a service of an application which has been executed by the guest system may be provided seamlessly according to the input/output unit capability of the host system although the guest system does not have specific information about the input/output unit capability of the host system. In this case, the application of the guest system can be maintained without any change, and application(s) running in the guest operating system may only see virtual device drivers and may not need to worry about device specific settings and configuration.

Figure 2:
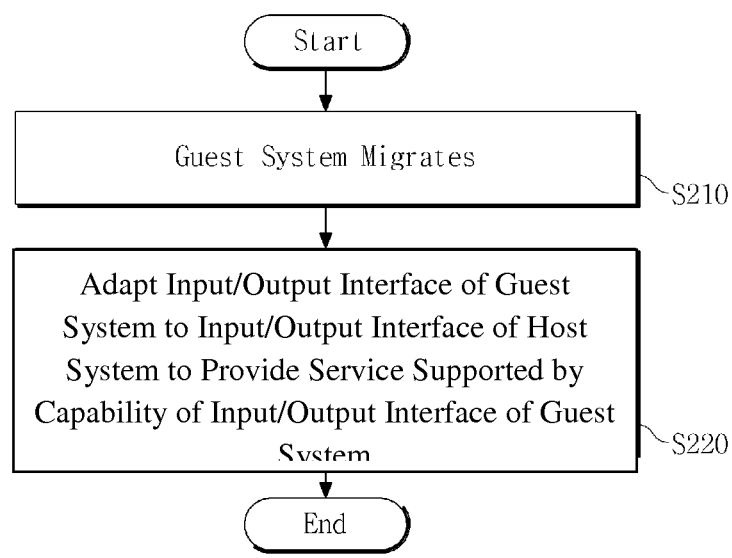
FIG. 2 is a flowchart illustrating an exemplary method for dynamic adaptation of an input/output interface in a virtualization environment.

FIG. 2 shows a flowchart of an exemplary method for dynamic adaptation of an input/output interface in a virtualization environment.

Referring to FIGS. 1 and 2, the guest system 400 migrates to an apparatus where the host system 300 exists (operation S210). The host system 300 adapts the input/output interface of the guest system 400 to the input/output interface of the host system 300 so that a service of an application running in the guest system 400 and supported by the capability of the input/output interface of the guest system 400 is provided according to the capability of an input/output unit type desired by the guest system 400 among at least one input/output unit installed in the host system 300 (operation S220).

Figure 3:
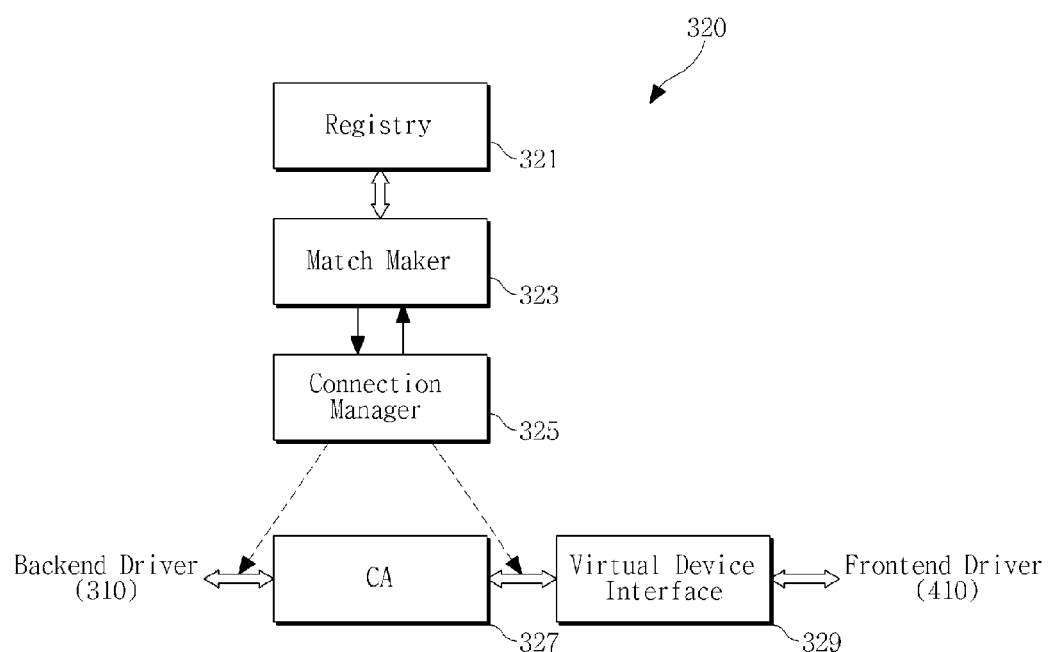
FIG. 3 is a block diagram illustrating an exemplary apparatus for dynamic adaption of an input/output interface in a virtualization environment.

FIG. 3 shows an exemplary apparatus for dynamic adaption of an input/output interface in a virtualization environment.

The input/output interface adaptation apparatus may correspond to the input/output supporting unit 320 of FIG. 1. Referring to FIG. 3, the input/output interface adaptation apparatus 320 includes a registry 321, a match maker 323, a connection manager 325, a capability adaptor (CA) 327, and a virtual device interface 329.

The registry 321 includes a plurality of capability adaptors to provide a service supported by the capability of an input/output unit to input/output units having different capabilities. A dynamic CA algorithm for selecting at least one of the plurality of capability adaptors may be registered in the registry 321. For example, the registry 321 may use a dynamic link library. The registry 321 may uninstall a capability adaptor which is no longer needed.

The match maker 323 selects at least one capability adaptor from among the plurality of capability adaptors to adapt the capability of an input/output unit set up in the guest system 400 (see FIG. 1) to capability of an input/output unit type of the host system 300 desired by the guest system 400.

The connection manager 325 monitors whether the frontend driver 410 (see FIG. 1) of the guest system 400 is found. In response to the frontend driver 410 being found, the connection manager 325 creates a virtual device interface 329 to connect the frontend driver 410 to the backend driver 310 (see FIG. 1) corresponding to the input/output unit type desired by the guest system 400. The backend driver 310 is not connected to the frontend driver 410 directly. Instead, the connection manager 325 connects the backend driver 310 through an appropriate capability adaptor (CA) and the virtual device interface 329 to the frontend driver 410.

The connection manager 325 causes the frontend driver 410 to communicate with the host system 300 through the virtual device interface 329, thereby monitoring whether a frontend driver of a new guest system is found.

The connection manager 325 requests information on capability of an input/output unit set up in the guest system 300 and information on capability of an input/output unit of the host system 300 desired by the guest system 400, to the backend driver 310 and the frontend driver 410, receives the information from the backend driver 310 and the frontend driver 410, and transfers the received information to the match maker 323. The match maker 323 selects an appropriate capability adaptor from the plurality of capability adaptors based on the received information and transfers information on the selected capability adaptor to the connection manager 325. Accordingly, the connection manager 325 can connect the selected capability adaptor to the virtual device interface 329 and the backend driver 310 corresponding to the input/output unit type desired by the guest system 400.

For example, the connection manager 325 transfers to the match maker 323 a message indicating that the virtual device interface 329 requires an 800×600 screen whereas an available backend driver 310 provides a 400×300 screen. In this case, the match maker 323 lets the connection manager 325 know an appropriate capability adaptor capable of performing a shrinking algorithm. Then, the connection manager 325 connects the capability adaptor to the virtual device interface 329 and the backend driver 310 of the corresponding input/output unit.

In FIG. 3, CA 327 represents the capability adaptor selected by the match maker 323, which is connected between the backend driver 319 and the virtual device interface 329. While the CA 327 is shown as a separate module in FIG. 3, it is understood that the CA 327 may be implemented in various ways as long as it can be connected between the virtual device interface 329 and the backend driver 310.

The virtual device interface 329 takes charge of the connection between the frontend driver 410 and the host system 300. For example, the virtual device interface 329 may set up event channels and shared pages with the frontend driver 410 for later data communication based on Xen mechanism. The virtual device interface 329 may be implemented as a device capable of performing different functions according to the types of the input/output units of the host system 300 and guest system 400. Also, the virtual device interface 329 provides an interface between the CA 327 and the frontend driver 410 of the guest system 400. The frontend driver 410 connects to the virtual device interface 329 when finding the virtual device interface 329.

Figure 4:
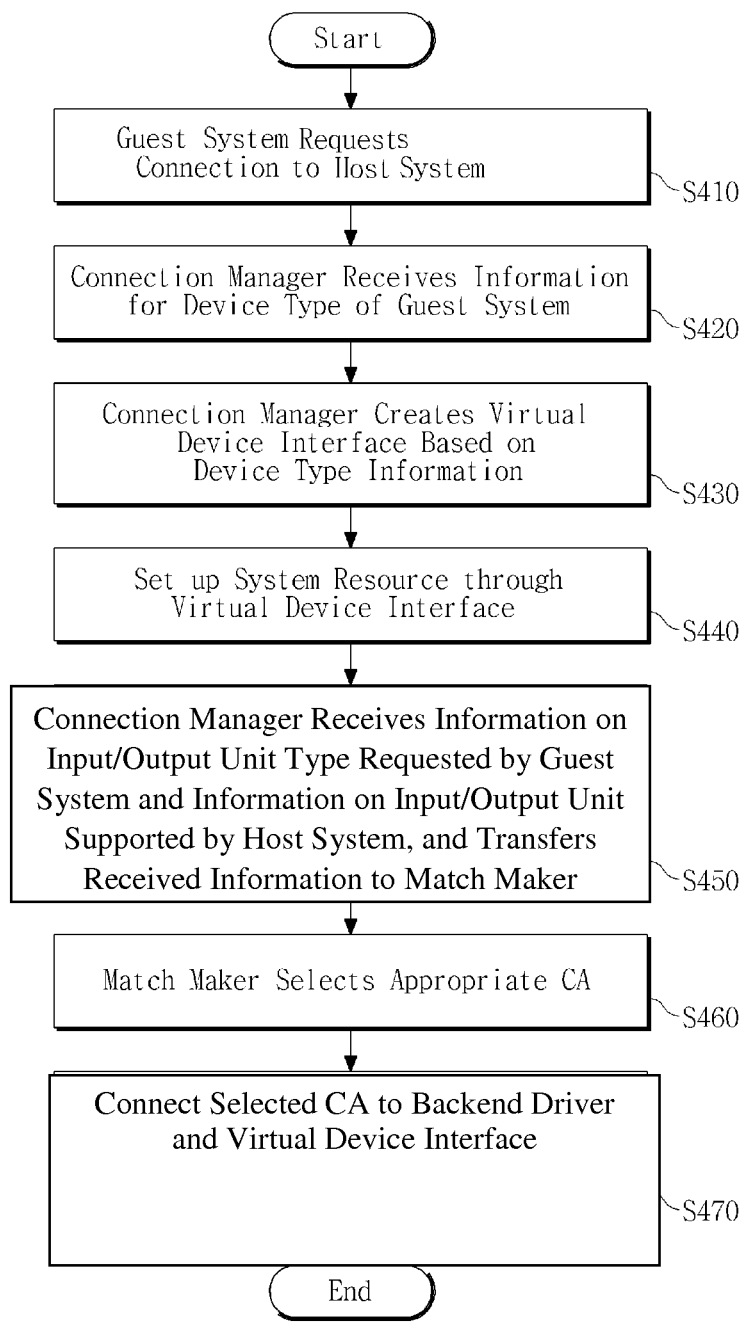
FIG. 4 is a flowchart illustrating another exemplary method for dynamic adaptation of an input/output interface in a virtualization environment.

FIG. 4 shows a flowchart of another exemplary method for dynamic adaptation of an input/output interface in a virtualization environment. FIG. 4 shows a process in which a backend driver of a host system is connected to a frontend driver of a guest system.

Referring to FIGS. 1, 3 and 4, the frontend driver 410 of the guest system 400 requests a connection to the host system 300 (operation S410). At this time, the frontend driver 410 transfers to the host system 300 information on a device type to which the guest system 400 wants to connect.

The connection manager 325 receives the connection request and the information on the device type to which the guest system 400 wants to connect (operation S420). Then, the connection manager 325 provides a virtual device interface 329 based on the information on the device type (operation S430).

The virtual device interface 329 sets up an event transfer mechanism between system resources (for example, shared memories, virtual machines, etc.,) requested for communicating with the fronted driver 410 of the guest system 400 (operation S440).

The connection manager 325 requests information on capability of an input/output unit set up in the guest system 400 and information on capability of an input/output unit of the host system 300 desired by the guest system 400, to the backend driver 310 and the frontend driver 410, receives the information from the backend driver 310 and the frontend driver 410, and transfers the received information to the match maker 323 (operation S450).

The match maker 323 selects at least one capability adaptor from among the plurality of capability adaptors to adapt the capability of the input/output unit set up in the guest system 400 to capability of the input/output unit type desired by the guest system 400 (operation S460).

Then, the connection manager 325 connects the capability adaptor selected by the match maker 323 to the virtual device interface 329 and the backend driver 310 corresponding to the desired input/output unit type (operation S470).

After the capability adaptor is connected to the virtual device interface 329 and the backend driver 310, data may flow without the involvement of the connection manager 325. For example, the data executed by the guest system 400 is transferred in the order of the frontend driver 410->virtual device interface 329->capability adaptor 327->backend driver 310->physical input/output unit 100 (see FIG. 1), and then output. Also, information received through the physical input/output unit 100 is transferred in the order of the backend driver 310->capability adaptor 327->virtual device interface 329->frontend driver 410, and thus input to the guest system 400.

Figure 5:
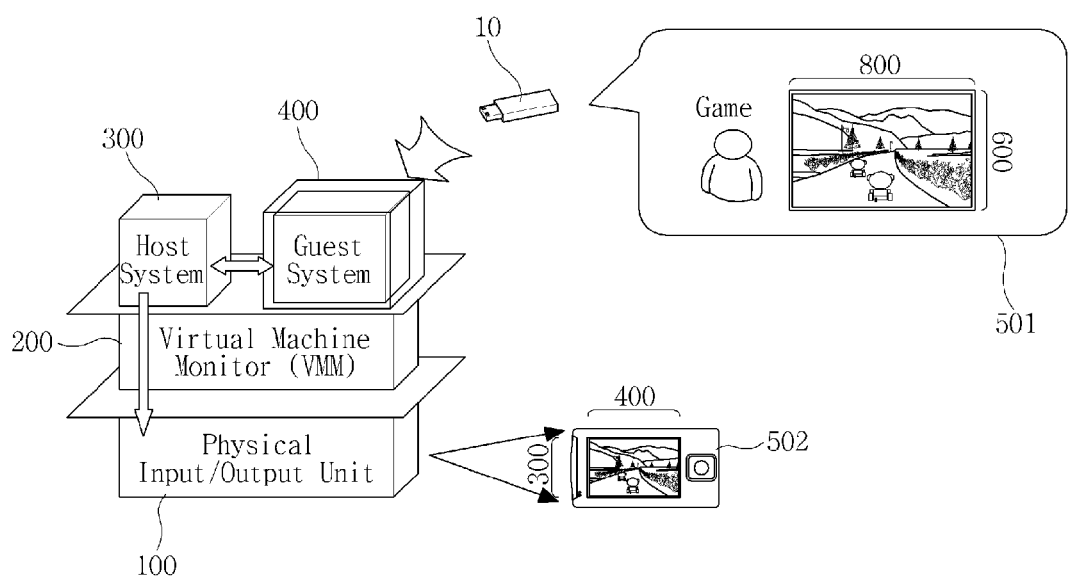
FIG. 5 is a diagram illustrating an example in which an input/output interface is dynamically adapted in a virtualization environment.

FIG. 5 illustrates an example in which an input/output interface is dynamically adapted in a virtualization environment.

FIG. 5 shows the case where a frame buffer resolution is set to 800×600 in a frame buffer frontend driver for a display 501 of a guest system 400, and a frame buffer backend driver for a display 502 of a host system 300 supports a resolution of 400×300. Here, the guest system 400 migrates to an apparatus where the host system 300 exists through a portable storage 10.

Referring to FIGS. 3 and 5, in this case, the connection manager 325 transfers information on the capabilities of frame buffers obtained from the frontend driver and backend driver to the match maker 323, and requests an appropriate capability adaptor to the match maker 323. The match maker 323 informs the connection manager 325 of information on an appropriate capability adaptor which can convert the resolution of 800×600 to 400×300 in correspondence to the capability of the backend driver.

The connection manager 325 connects the capability adaptor to a virtual device interface 329 which may be provided in advance. Accordingly, a moving picture service of a game application, which has been executed in the guest system 400, can be provided adaptively according to the display requirements of the host system 300.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus in a host device to adapt an input/output interface of the host device with an input/output interface of a guest device, the apparatus comprising:

a host processor comprising capability adaptors and configured to select a capability adaptor from among the capability adaptors to adapt a capability of the input/output unit in the guest device to the capability of an input/output unit of the host device desired by the guest device.

2. The apparatus as recited in claim 1, further comprising:
a non-transitory computer-readable storage medium storing instructions for the host device to adapt the capability of the input/output unit in the guest device to the capability of the input/output unit of the host device.

3. The apparatus as recited in claim 1, wherein the capability adaptors are dynamically changed.

4. The apparatus as recited in claim 1, wherein the host device is a mobile phone, a mobile internet device, a digital television, a personal digital assistant, or an ultra mobile personal computer.

5. The apparatus as recited in claim 1, wherein the capability adaptors comprise a capability adaptor to convert a first resolution to a second resolution.

6. The apparatus as recited in claim 1, wherein the host device is a mobile phone, a mobile internet device, a digital television, a personal digital assistant, or an ultra mobile personal computer.

7. The apparatus as recited in claim 6, wherein the input/output interface of the host device comprises a display, an audio output unit, a keyboard, a mouse, a track ball, a touch pad, a graphic tablet, or a joystick.

8. The apparatus as recited in claim 1, wherein the guest device is a mobile phone, a mobile internet device, a digital television, a personal digital assistant, or an ultra mobile personal computer.

9. The apparatus as recited in claim 8, wherein the input/output interface of the guest device comprises a display, an audio output unit, a keyboard, a mouse, a track ball, a touch pad, a graphic tablet, or a joystick.

10. An apparatus, comprising:
a match processor configured to select a capability adaptor from among capability adaptors to adapt a capability of an input/output unit of a guest device to an input/output unit of a host device comprising a different capability; and
a device interface configured to control a connection between the guest device and the host device using the selected capability adaptor.

11. The apparatus as recited in claim 10, further comprising:
a registry comprising the capability adaptors to adapt a service supported by the capability of the guest device to different capabilities of the host device.

12. The apparatus as recited in claim 10, wherein the device interface is further configured to control the connection between a frontend driver of the guest device and a backend driver of the host device.

13. The apparatus as recited in claim 12, further comprising: ,
a connection manager configured to connect the backend driver through the selected capability adaptor and the device interface to the frontend driver of a guest device.

14. The apparatus as recited in claim 10, further comprising:
a connection manager configured to connect a frontend driver of the guest device to a backend driver of the host device corresponding to an input/output unit type of the host device desired by the guest device and to enable the frontend driver to communicate with the host device through the device interface.

15. The apparatus as recited in claim 10, wherein the input/output unit of the host device comprises a display, an audio output unit, a keyboard, a mouse, a touch pad, or a graphic tablet.

16. The apparatus as recited in claim 10, wherein the apparatus is comprised in a mobile phone, a mobile internet device, a digital television, a personal digital assistant, or an ultra mobile personal computer.

17. The apparatus as recited in claim 10, wherein the capability adaptors are dynamically changed.

18. The apparatus as recited in claim 10, wherein the capability adaptors comprise a capability adaptor to convert a first resolution to a second resolution.

19. The apparatus as recited in claim 10, wherein the host device is a mobile phone, a mobile internet device, a digital television, a personal digital assistant, or an ultra mobile personal computer.

20. The apparatus as recited in claim 19, wherein the input/output interface of the host device comprises a display, an audio output unit, a keyboard, a mouse, a track ball, a touch pad, a graphic tablet, or a joystick.

21. The apparatus as recited in claim 10, wherein the guest device is a mobile phone, a mobile internet device, a digital television, a personal digital assistant, or an ultra mobile personal computer.

22. The apparatus as recited in claim 21, wherein the input/output interface of the guest device comprises a display, an audio output unit, a keyboard, a mouse, a track ball, a touch pad, a graphic tablet, or a joystick.

23. An apparatus, comprising:
a registry comprising capability adaptors to provide a service supported by a capability of an input/output unit of a guest device to input/output units of a host device having different capabilities;
a match processor configured to select a capability adaptor from the capability adaptors to adapt the capability of the input/output unit of the guest device to a capability of an input/output unit of the host device desired by the guest device; and
a connection manager configured to create a device interface to connect a frontend driver of the guest device to a backend driver of the host device.

24. The apparatus as recited in claim 23, wherein the connection manager is further configured to connect the backend driver through the selected capability adaptor and the device interface to the frontend driver of the guest device.

25. The apparatus as recited in claim 23, wherein the connection manager is further configured to request information about the capability of the input/output unit in the guest device to the frontend driver of the guest device and about the capability of the input/output unit of the host device desired by the guest device to the backend driver of the host device and configured to transmit the requested information to the match processor.

26. The apparatus as recited in claim 25, wherein the match processor is further configured to select the capability adaptor from the capability adaptors based on the requested information from the connection manager and configured to transfer information of the selected capability adaptor to the connection manager.

27. The apparatus as recited in claim 23, wherein the device interface controls a connection between the frontend driver of the guest device and the host device.

28. The apparatus as recited in claim 23, wherein the device interface provides an interface between the selected capability adaptor and the frontend driver of the guest device.

29. An apparatus to adapt an input/output interface of a host device with an input/output interface of a guest device, the apparatus comprising:
- a registry comprising capability adaptors;
- a match processor configured to select a capability adaptor from the capability adaptors;
- a device interface configured to connect the input/output interface of the host device with the input/output interface of the guest device; and
- a connection manager configured to connect the guest device with the host device, wherein the connection between the guest device and the host device is formed through the selected capability adaptor and the device interface.

30. The apparatus as recited in claim 29, wherein the host device comprises a backend driver, the guest device comprises a frontend driver, and the connection manager connects the frontend driver to the backend driver.

31. The apparatus as recited in claim 29, wherein the host device is a mobile phone, a mobile internet device, a digital television, a personal digital assistant, or an ultra mobile personal computer.

32. The apparatus as recited in claim 31, wherein the input/output interface of the host device comprises a display, an audio output unit, a keyboard, a mouse, a track ball, a touch pad, a graphic tablet, or a joystick.

33. The apparatus as recited in claim 29, wherein the guest device is a mobile phone, a mobile internet device, a digital television, a personal digital assistant, or an ultra mobile personal computer.

34. The apparatus as recited in claim 33, wherein the input/output interface of the guest device comprises a display, an audio output unit, a keyboard, a mouse, a track ball, a touch pad, a graphic tablet, or a joystick.

35. The apparatus as recited in claim 29, wherein the selected capability adaptor is configured to adapt the input/output interface of the guest device to the input/output interface of the host device.

36. The apparatus as recited in claim 29, wherein the capability adaptors are dynamically changed.

37. The apparatus as recited in claim 29, wherein the capability adaptors comprise a capability adaptor to convert a first resolution to a second resolution.

* * * * *